Patented Oct. 9, 1945

2,386,337

UNITED STATES PATENT OFFICE 2,386,337

PROCESS FOR MAKING FINELY DIVIDED SILICA

Paul S. Moyer, deceased, late of Lake Forest, Ill., by Elizabeth F. Moyer, administratrix, Lake Forest, Ill.

No Drawing. Application October 25, 1941, Serial No. 416,582

10 Claims. (Cl. 23—182)

The present invention relates to an improved process for the manufacture of extremely finely divided silica from such materials as the alkali silicates, and the product thus made. Primarily the process involves the conversion of an aqueous alkali silicate solution into particles of free silicic acid, or silica, by the expedient of admixing the solution with a considerable volume of a water-miscible organic liquid such as a ketone, alcohol, or the like, which has the effect of throwing the silicate out of solution in the form of fine particles of the alkali silicate.

The resulting suspension of particles is then neutralized with an acid-reacting material so as to produce the free silicic acid, or silica, while at the same time forming a solution of the sodium salt of the particular acid-reacting material employed. The silica thus produced is then filtered off, washed substantially free from water-soluble material, and then dried. The dry product may, if desired, be lightly ground in order to re-separate it into its constituent particulate form in case there has been any formation of aggregates of particles into lumps.

The material produced is characterized by being in such finely divided form that the particles in most cases are not much larger than 1.0 or 1.5 microns and in any event very much smaller than could be obtained by the grinding of ordinary silica, rock, or sand. Moreover, the particles are substantially globular and free from sharp edges and are hence desirable if the product is to be used as a filler in paints or enamels, for example as a base for application to metallic plates to which lithographing or printing is to be applied.

As a more particular example of the method of carrying out the present invention, for example, a solution of sodium silicate may be prepared, containing approximately 10% of sodium silicate, which may be any of the commercially available forms of this commodity, but most advantageously is in the form of water-glass.

A solution of sodium silicate containing about 10% of total solids—such as may, for instance, be produced by diluting 190 grams of a 38% solution of sodium silicate with 800 c. c. of hot water, so adjusted that the mixture will have a temperature of about 130° F.—may be poured into a mixture of 800 c. c. of methyl alcohol (methanol) and 100 c. c. of water. The alcohol solution should be rapidly stirred as the sodium silicate solution is introduced, the result being the separation of very finely divided globular particles of sodium silicate. This forms a sort of creamy suspension in which, however, the sodium is still united with the silicic acid component. The suspension is then neutralized until it is faintly acid. This may be accomplished by any suitable acid-reacting material, or organic or mineral acid, but preferably is accomplished by passing carbon dioxide gas into and through the mixture. The bubbling of the carbon dioxide gas also serves as a means of agitating the mixture. The acid-reacting substance used will unite with the sodium component of the silicate, forming the corresponding sodium salt. In the case of carbon dioxide, it will obviously be sodium carbonate; and, as sufficient carbon dioxide is used to produce a faintly acid reaction, most of the sodium carbonate will have been changed over into bicarbonate. The resulting suspension of free silica, then probably in the form of silicic acid, is filtered or otherwise treated to recover therefrom the free silicic acid particles, which are then washed, preferably by means of a mixture of methanol and water, having about the same relative proportions of alcohol and water as have been present in the mixture of the silicate solution and the alcohol. The reason for this is to avoid, if possible, re-solution of silicic acid or silica during the washing operation. The resulting filter cake, if filtration has been used as a separating means, is then dried and may be lightly ground or separated back into its original particles.

The filtrate as well as the wash-liquor are combined, thus producing an aqueous solution of, in this case, sodium carbonate and bicarbonate and alcohol. This solution is then fractionally distilled to recover from it the therein contained methanol, which of course may be re-used immediately in the further carrying out of the process—that is to say, for the treatment of further batches of silicate solution. The residue in the still, containing the sodium carbonate and bicarbonate, is then evaporated to dryness, thus recovering the sodium salts. They either may be sold or, quite advantageously, may be mixed with an appropriate amount of silica, as for example a high silica sand, and heated therewith to gentle fusion, thereby producing a new supply of sodium silicate. As a result of the reaction between the sodium carbonate and bicarbonate with the silica, carbon dioxide will be liberated and thus may be employed for the further carrying out of the process. This gas may be stored to form a supply which may be passed into a subsequently made new suspension of sodium silicate particles in a mixture of methanol and water.

It will be seen that by this expedient a complete cyclic process will eventuate in which, starting with sodium carbonate and sand, extremely finely divided silica can be produced. The only ingredient thus used up will be the sand or other source of silica, while the alcohol and the sodium salt, i. e., the carbonate, are continually regenerated in the process.

If instead of carbon dioxide, hydrochloric acid, for example, is employed, this will, of course, form sodium chloride, which will be in the residue of the distillation of the alcohol. This sodium chloride can also be melted with sand, forming sodium silicate, while liberating hydrochloric acid, which may then be re-used in the process.

However, the process is not limited to a cyclic operation, and therefore other acids or acid-reacting substances may be employed for the purpose of removing the sodium component of the finely divided precipitated silica.

While the process has been described in connection with sodium silicate and methanol, it will be obvious to any experienced chemist that it can be practiced, with substantially the same results, by starting out with potassium silicate. Furthermore, the methanol employed for precipitating the alkali silicate solution may be replaced by equivalent materials, such as other alcohols of the aliphatic series such as ethyl alcohol (ethanol), propyl or isopropyl alcohol, or some other water-soluble or water-miscible organic liquid such as acetone, ethyl-methyl ketone, and the like. However, methanol is probably the least expensive and most easily procurable of these materials, and hence is the preferred substance for the carrying out of the present invention.

The product, in addition to the uses already given for it, also forms an excellent filler or pigment which may be used in paper coating compositions and the like.

Obvious modifications of the process herein disclosed, such as those which will occur to any skilled chemist, are to be construed as within the scope of the present invention, for which is claimed:

1. Process of preparing very finely divided silica which comprises mixing an aqueous solution of an alkali silicate with a water-miscible organic liquid non-reactive therewith, thereby precipitating said silicate in finely divided form, and acidulating the suspension to form free silica, separating the latter from the liquid, and drying the same.

2. Process of preparing very finely divided silica which comprises mixing an aqueous solution of an alkali silicate with a water-miscible organic liquid non-reactive therewith, acidulating the mixture, separating the thus formed free silica from the liquid, and drying the same.

3. Process of preparing very finely divided silica which comprises mixing an aqueous solution of an alkali silicate with a water-miscible organic liquid non-reactive therewith, passing carbon dioxide gas into the resulting mixture until it has been substantially neutralized, separating the thus formed free silica from the liquid, and drying the same.

4. Process of preparing very finely divided silica which comprises mixing an aqueous solution of sodium silicate with a water-miscible alcohol, neutralizing the mixture with an acid-reacting substance, separating the thus formed free silica from the liquid, and drying the same.

5. Process of preparing very finely divided silica which comprises pouring an aqueous solution of sodium silicate into methanol to precipitate finely divided sodium silicate particles, adding sufficient acid-reacting material to the suspension to abstract the sodium from the precipitate and to convert it into silicic acid, separating the latter from the liquid in which it is suspended, washing the same substantially free from soluble material, and drying the silica particles thus obtained.

6. The process of claim 5, in which the acid-reacting substance is carbonic acid.

7. Cyclic process of producing very finely divided silica which comprises dissolving sodium silicate in water to form a solution, pouring the latter into a substantial volume of a water-miscible organic liquid non-reactive therewith to precipitate said silicate in finely divided form, passing carbon dioxide into the suspension to form free silica and sodium carbonate, separating the silica from the liquid in which it is suspended, washing and drying it, collecting the filtrate and wash-liquor, distilling the organic liquid therefrom for re-use, recovering the sodium carbonate from the residual liquid and heating the same with silica to form sodium silicate and carbon dioxide, dissolving the former to form a sodium silicate solution, pouring the latter into the recovered organic liquid and passing the carbon dioxide into the suspension.

8. The process of claim 7, in which the organic liquid is an alcohol.

9. The process of claim 7, in which the organic liquid is a ketone.

10. The process of claim 7, in which the organic liquid is methanol.

ELIZABETH F. MOYER,
*Administratrix of the Estate of Paul S. Moyer, Deceased.*